US006771896B2

(12) United States Patent
Tamura et al.

(10) Patent No.: US 6,771,896 B2
(45) Date of Patent: Aug. 3, 2004

(54) ELECTRIC CAMERA WITH IMAGE PRINTING SYSTEM

(75) Inventors: Tomoaki Tamura, Hachioji (JP); Chie Nemoto, Hachioji (JP); Takaichi Hayashida, Hachioji (JP); Madoka Shoji, Hachioji (JP); Keita Kimizuka, Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/165,315

(22) Filed: Oct. 2, 1998

(65) Prior Publication Data

US 2002/0048455 A1 Apr. 25, 2002

(30) Foreign Application Priority Data

Oct. 3, 1997 (JP) .............................................. 9-271288
Oct. 9, 1997 (JP) .............................................. 9-277309
Mar. 23, 1998 (JP) .......................................... 10-092178

(51) Int. Cl.[7] ........................ G03B 17/00; G03B 17/24; G03B 7/26; H04N 5/225; H04N 5/232
(52) U.S. Cl. ........................ 396/57; 396/279; 396/310; 348/207.2; 348/211.2; 348/231.2
(58) Field of Search ............................ 396/56, 57, 277, 396/279, 300, 310, 321, 281; 399/8; 348/231, 232, 207.2, 211.2, 231.2, 231.3, 231.6

(56) References Cited

U.S. PATENT DOCUMENTS

| | | | | |
|---|---|---|---|---|
| 4,728,978 A | * | 3/1988 | Inoue et al. ................. 396/310 |
| 5,229,810 A | * | 7/1993 | Cloutier et al. .............. 355/40 |
| 5,488,558 A | * | 1/1996 | Ohki .......................... 701/207 |
| 5,633,678 A | * | 5/1997 | Parulski et al. ............. 348/231.5 |
| 5,666,578 A | * | 9/1997 | Oikawa et al. .............. 396/319 |
| 5,694,019 A | * | 12/1997 | Uchida et al. ............... 320/6 |
| 5,799,217 A | * | 8/1998 | Saegusa et al. ............. 396/279 |
| 5,806,005 A | * | 9/1998 | Hull et al. ................... 348/14.12 |
| 5,862,218 A | * | 1/1999 | Steinberg .................... 348/231.3 |
| 5,898,386 A | * | 4/1999 | Kaihatsu ..................... 340/825.69 |
| 5,917,542 A | * | 6/1999 | Moghadam et al. ....... 348/231.99 |
| 5,974,401 A | | 10/1999 | Enomoto et al. ........... 705/40 |
| 6,006,039 A | * | 12/1999 | Steinberg et al. .......... 396/57 |
| 6,167,208 A | * | 12/2000 | Sato ........................... 396/532 |
| 6,198,526 B1 | * | 3/2001 | Ohtsuka ...................... 355/40 |
| 6,201,571 B1 | * | 3/2001 | Ota ............................. 348/231.3 |
| 6,552,743 B1 | * | 4/2003 | Rissman ...................... 348/207.2 |
| 6,701,058 B1 | * | 3/2004 | Tsubaki ....................... 348/211.2 |

FOREIGN PATENT DOCUMENTS

EP        0860980 A  *  8/1998  ............ H04N/1/21

OTHER PUBLICATIONS

Understanding Data Communications, Second Edition, by George Friend et al. Published 1988 by Howrd W. Sams and Company (p. 177).*

* cited by examiner

Primary Examiner—Christopher Mahoney
(74) Attorney, Agent, or Firm—Finnegan, Henderson Farabow, Garrett & Dunner, L.L.P.

(57) ABSTRACT

In a camera provided with image-pickup elements for receiving light to form an image of a subject, for converting the light into electric signals and for producing image information of the image of the subject by the electric signals; there are further provided a print information producing device to produce print information for printing the image information; and a transmitor to transmit the image information and the print information.

18 Claims, 13 Drawing Sheets

FIG. 5(a)

224 DISPLAY SECTION

| ORDER RECEIVING NUMBER | CUSTOMER NAMES | THE TIME AND DATE TO FINISH PRINTING |
|---|---|---|
| 97100100100 | 田村　様 | 97/10/01　11：00 |
| 97100100101 | 高崎　様 | 97/10/01　11：12 |
| 97100100102 | 佐藤　様 | 97/10/01　11：18 |
| 97100100103 | 田口　様 | 97/10/01　11：45 |
| 97100100104 | 加藤　様 | 97/10/01　11：28 |
| 97100100105 | 山田　様 | 97/10/01　11：30 |
| 97100100106 | 井島　様 | --/--/--　--：-- |

FIG. 5(b)

224 DISPLAY SECTION

| ORDER RECEIVING NUMBER | CUSTOMER NAMES | WAITING TIME |
|---|---|---|
| 97100100100 | 田村　様 | FINISH |
| 97100100101 | 高崎　様 | IN PROCESS OF PRINTING |
| 97100100102 | 佐藤　様 | 10 MINUTES |
| 97100100103 | 田口　様 | 25 MINUTES |
| 97100100104 | 加藤　様 | 45 MINUTES |
| 97100100105 | 山田　様 | 60 MINUTES |
| 97100100106 | 井島　様 | IN PROCESS OF ORDER RECEIVING |

ELECTRIC CAMERA WITH IMAGE PRINTING SYSTEM

BACKGROUND OF THE INVENTION

The present invention relates to an electronic camera and a printing system, and more specifically, to a camera capable of preparing print information of digital image information obtained through photographing, and a printing system suitable for printing of image information.

There has recently been conducted printing wherein a print is made by a color printer from digital image information obtained by using an electronic camera for photographing.

There has also been proposed a service wherein prints with high image quality are made by processing or printing, using an expensive equipment, based on the digital image information.

In consideration of the time required for preparing contents of the order in the store and confusion generated there, it has also been proposed that digital image information obtained through photographing is inputted and processed in a computer to prepare the order information in advance, and this order information is transferred to a recording medium which permits installation and removal (PC card, various memory cards and others) to be used for order receiving for prints.

However, when digital image information recorded on the recording medium that permits installation and removal is accepted on an order receiving apparatus, order receiving is repeated many times. Accordingly, there is a possibility that the recording medium or a contact of the order receiving apparatus is worn away to make accurate order receiving impossible.

When ordering prints, using the recording medium as that stated above, a user can not confirm whether the order has been correctly placed or not, which is a problem.

Therefore, it sometimes happens that a user is told to order again due to troubles in the ordering, when the user visits a store to get prints.

Further, there is no means with which a user confirms in the case of order placing how long has he or she wait until completion of prints or when prints have been completed, which has been a problem.

Further, as another embodiment of a printing system, there is considered a home printing system wherein image data obtained by an electronic camera through photographing in the user's house are inputted in a personal computer through a cord connected directly or through a recording medium such as a memory card, for example, then a print style is determined, and then a print is made by a printer connected to the personal computer. In this case, for printing image data obtained by an electronic camera through photographing, a personal computer and a printer are necessary in addition to the electronic camera. As a printer, there is available a printer which has a display function and a control function both are of a simple type and is relatively inexpensive. However, a personal computer is expensive. Therefore, it is a severe burden for a user of an electronic camera who has no personal computer to be forced to buy the personal computer.

SUMMARY OF THE INVENTION

An object of the invention, therefore, is to provide an electronic camera and a printing system capable of inputting image data into a printer without dismounting a recording medium in which image data are recorded from the electronic camera.

An object is to provide a printing system requiring no personal computer.

An object is to provide a printing system capable of preparing order information simply, capable of receiving order accurately and capable of making a user to confirm the state of order receiving.

An object is to provide a printing system capable of making a user to confirm the waiting time up to completion of prints.

An object is to provide a printing system capable of making a user to confirm how internal power supply of an electronic camera lasts for the waiting time up to completion of prints.

Objects stated above can be attained by the following structure.

1. A camera having therein the following structure:
    an image pickup means which receives optical images concerning a subject, then converts them into electric signals, and prepares image information;
    a print information preparing means which prepares print information used for printing the image information stated above; and
    a transmitting means which transmits after making the image information and the print information both stated above to be corresponded each other.

Due to Structure 1, when an electronic camera itself has a function to prepare information needed for printing images and further a transmitting means which makes image information and print information to be corresponded each other to transmit, it is possible to transmit a command for forming images to the printing system, and thereby to form desired images, without dismounting a recording medium in which image data are recorded from the electronic camera and without using another personal computer.

2. The camera further having the following structure:
    a receiving means which receives image forming apparatus information representing the state of an image forming apparatus which receives the image information and print information both stated above; and
    a display means which displays print information prepared and information received.

Due to Structure 2, when the state of print order receiving or the waiting time up to completion of prints, for example, is received and displayed as image forming apparatus information, a user can confirm the waiting time up to completion of prints.

3. An image forming apparatus having therein the following structure:
    a receiving means which receives image information and print information used for printing, the receiving means being capable of receiving transmitting apparatus information concerning the apparatus to which the image information is transmitted;
    an image forming means for forming images based on the image information and the print information; and
    a control means for controlling the aforesaid image forming means based on the transmitting apparatus information.

Due to Structure 3, when information about the state of an electronic camera is received as transmitting apparatus information, it is possible to know the state of the electronic camera on the part of the printing system, and to prevent communication troubles caused by dead batteries of the electronic camera.

4. An image forming apparatus having therein the following structure:
   a receiving means which receives image information and print information used for printing;
   an order receiving information preparing means which prepares order receiving information based on the image information and the print information;
   an image forming means for forming images based on the image information and the print information; and
   a transmitting means which transmits the aforesaid order receiving information.

Due to Structure 4, when the state of order receiving or the waiting time up to completion of prints is outputted as the order receiving information, it is possible for a user to confirm these pieces of information. It is further possible to determine easily how the power supply lasts, from the waiting time up to completion of prints and residual life of the battery of the electronic camera.

The aforesaid objects of the invention can also be attained by the following preferable structures.

5. A printing system equipped with an electronic camera which prepares digital image information and with a printing apparatus which receives order information from the electronic camera to conduct printing, wherein the electronic camera to conduct printing, wherein the electronic camera is equipped with a print information providing means which generates order information by providing print information corresponded to the digital image information and with a transmitting-receiving means which conducts transmission and receiving of data, while the printing apparatus is equipped with a receiving means which receives order information from the electronic camera, a printing means which makes prints based on the received order information, a display means which displays information, and a control means which generates order receiving information based on the received order information and makes the display means to display the order receiving information.

On this printing system, order receiving information is generated based on order information received from the electronic camera on the part of the printing apparatus, and the display means is caused to display the order receiving information.

Therefore, it is possible to receive orders accurately concerning the order information prepared on the part of the electronic camera, whereby a printing system wherein a user can confirm the state of order receiving can be realized.

6. The printing system according to Structure 5, wherein the printing apparatus stated above is equipped with a transmitting means, and the control means controls so that the transmitting means transmits order receiving information to the electronic camera based on order information received from the electronic camera.

In the printing system, order receiving information is transmitted from the transmitting means on the part of the printing apparatus to the electronic camera based on the order information received from the electronic camera.

Therefore, it is possible to receive orders accurately concerning the order information prepared on the part of the electronic camera, whereby a user can confirm the state of order receiving by the use of the electronic camera.

7. The printing system according to Structure 6, wherein the electronic camera is equipped with a display means capable of displaying information on which the information of the state of order receiving from the printing apparatus is displayed.

In the printing system, order receiving information is transmitted from the transmitting means on the part of the printing apparatus to the electronic camera based on the order information received from the electronic camera. The electronic camera displays information of the state of order receiving from the printing apparatus on the display means.

Therefore, it is possible to receive orders accurately concerning the order information prepared on the part of the electronic camera, whereby a user can confirm the state of order receiving on the display means of the electronic camera.

8. The printing system according to Structure 6 and Structure 7, wherein the information of the state of order receiving is represented by the waiting time up to completion of prints.

In the printing system, order receiving information is transmitted from the transmitting means on the part of the printing apparatus to the electronic camera based on the order information received from the electronic camera. The electronic camera displays information of the state of order receiving from the printing apparatus (the waiting time up to completion of prints).

Therefore, it is possible to receive orders accurately concerning the order information prepared on the part of the electronic camera, whereby a user can confirm the state of waiting time by the use of the electronic camera.

9. The printing system according to Structure 6 and Structure 7, wherein the information of the state of order receiving is represented by the display showing whether the order receiving for prints is normal or not.

In the printing system, order receiving information is transmitted from the transmitting means on the part of the printing apparatus to the electronic camera based on the order information received from the electronic camera. The electronic camera displays information of the state of order receiving from the printing apparatus (information showing whether the order receiving for prints is normal or not).

Therefore, it is possible to receive orders accurately concerning the order information prepared on the part of the electronic camera, and it is further possible for a user to confirm whether the state of order receiving is normal or not by the use of the electronic camera.

10. The printing system according to Structure 5, wherein print information generated by the print information providing means includes personal information which makes it possible to call an orderer of prints.

In the printing system, it is possible to call an orderer promptly when prints are completed, because it is possible to call an orderer of prints based on information which follows print information.

11. The printing system according to Structure 11, wherein the printing apparatus stated above is equipped with a message transmitting means and transmits a message with reference to the personal information when prints are completed.

In the printing system, it is possible to call an orderer promptly when prints are completed, because it is possible to transmit a message through a telephone or a pager to a print orderer from a message transmitting means of the printing apparatus based on information which follows the print information.

12. The printing system according to Structure 5, wherein the electronic camera is equipped with a display means capable of displaying information and a countdown means, and the countdown means counts down based on the state of order receiving coming from the printing apparatus, while the display means displays the results of the countdown.

In the printing system, information of the state of order receiving is transmitted to the electronic camera from the part of the printing apparatus. Then, the electronic camera keeps counting down until completion of prints with reference to information of the state of order receiving, and displays the results of the countdown on the display means.

Therefore, it is possible to receive orders accurately concerning the order information prepared on the part of the electronic camera, whereby a user can confirm the state of order receiving and completion of prints through the display means of the electronic camera.

13. The printing system according to Structure 12, wherein the countdown means counts down based on the state of order receiving coming from the printing apparatus and notifies the end of counting when the counting is ended.

In the printing system, information of the state of order receiving is transmitted to the electronic camera from the part of the printing apparatus. Then, the electronic camera keeps counting down until completion of prints with reference to information of the state of order receiving, then, displays the results of the countdown on the display means, and notifies the moment of the end of counting.

Therefore, it is possible to receive orders accurately concerning the order information prepared on the part of the electronic camera, whereby a user can learn completion of prints through the end of counting.

14. The printing system according to Structure 12, wherein the electronic camera is equipped with a control means which controls various operations, and this control means prohibits deletion of images included in the order information until the countdown means finishes counting.

The electronic camera in the printing system counts down until completion of prints with reference to information of the state of order receiving, and thereby, deletion of images is prohibited until the end of counting. Therefore, even when the order information is required to be transmitted again for some reasons, no problem is caused.

15. The printing system according to Structure 5–Structure 14, wherein the electronic camera is equipped with a control means which generates state information relating to the state of the electronic camera and adds this state information to the order information, and the control means of the printing apparatus reads the state information added to the order information.

In the printing system of the invention, it is possible to know the state (communication speed, residual life of batteries, ON/OFF of image display and presence of usage of external power supply) of the electronic camera on the part of the printing apparatus because information of the state of the electronic camera is transmitted to the printing apparatus, and thereby, the operation time of the electronic camera can be estimated and dead batteries can be prevented in advance. Therefore, it is possible to receive orders accurately for the order information through stable communication.

16. The printing system according to Structure 15, wherein the printing apparatus is equipped with a warning giving means which gives warning by means of display, voice or data transmission, while the control means of the printing apparatus gives warning when batteries of the electronic camera are estimated, based on the state information, not to last until completion of transmission for order information.

In the printing system of the invention, it is possible to know the state (communication speed, residual life of batteries, ON/OFF of image display and presence of usage of external power supply) of the electronic camera on the part of the printing apparatus because information of the state of the electronic camera is transmitted to the printing apparatus, and thereby, it is possible to prevent dead batteries in advance by giving warning when dead batteries are estimated. Therefore, it is possible to receive orders accurately for the order information through stable communication.

17. The printing system according to Structure 16, wherein the control means of the printing apparatus gives warning based on the state information stated above when the electronic camera is not energized by the external power supply.

In the printing system of the invention, it is possible to know the state (communication speed, residual life of batteries, ON/OFF of image display and presence of usage of external power supply) of the electronic camera on the part of the printing apparatus because information of the state of the electronic camera is transmitted to the printing apparatus, and thereby, it is possible to prevent dead batteries in advance by giving warning when external power supply is not used and dead batteries are estimated accordingly. Therefore, it is possible to receive orders accurately for the order information through stable communication.

18. The printing system according to Structure 16, wherein the electronic camera is equipped with a display means capable of displaying information, and receives data from the warning giving means to display warning information from the printing apparatus on the display means.

In the printing system of the invention, information of the state of the electronic camera is transmitted to the printing apparatus, and when dead batteries are estimated at the printing apparatus, data from the printing apparatus are received on the part of the electronic camera to display warning, and thereby, dead batteries are prevented in advance. Therefore, it is possible to receive orders accurately for the order information through stable communication.

Each of FIGS. 5(a) and 5(b) is an illustration showing how order receiving of an order receiving apparatus in an embodiment of the invention is displayed.

Figure 6:
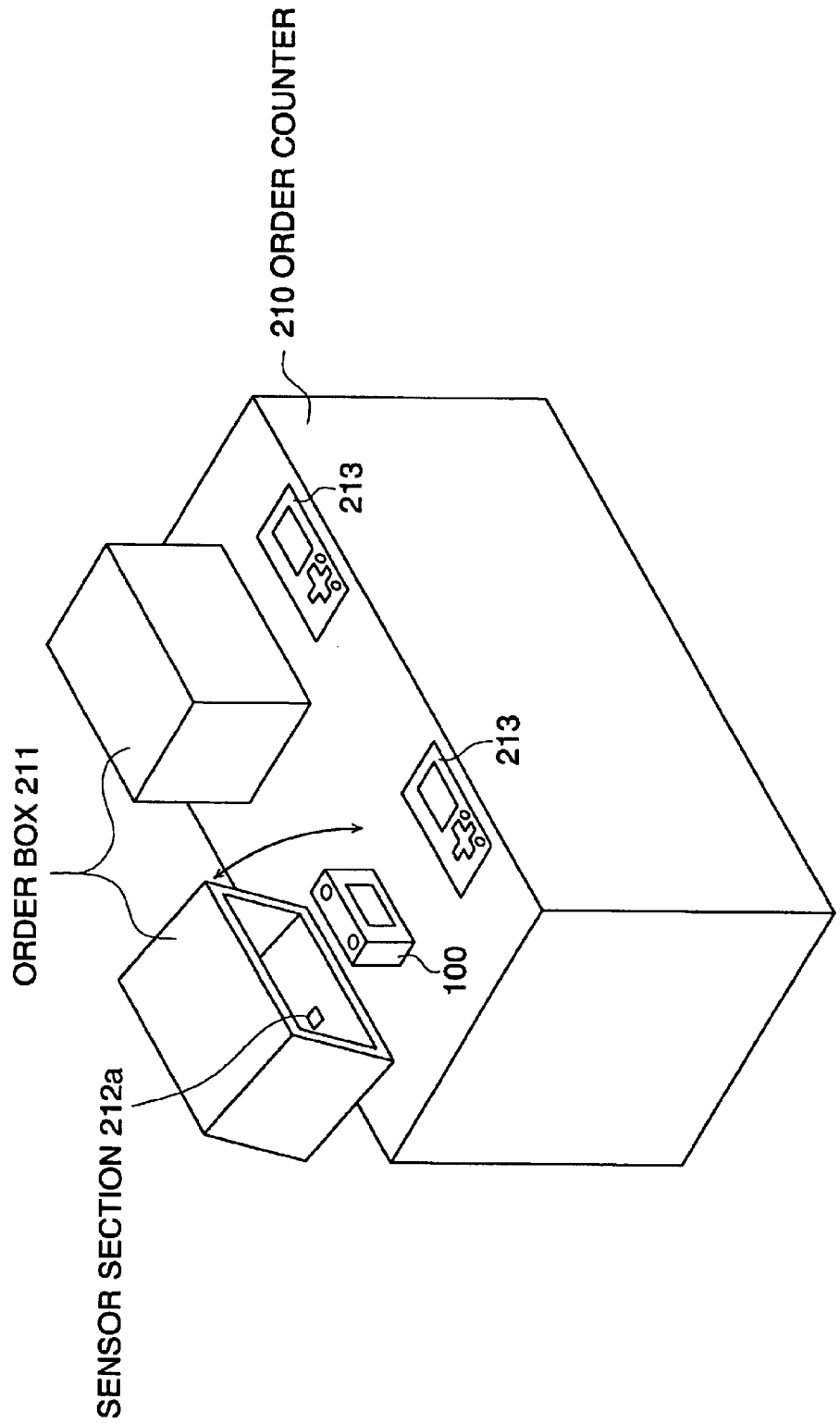
Figure 7:
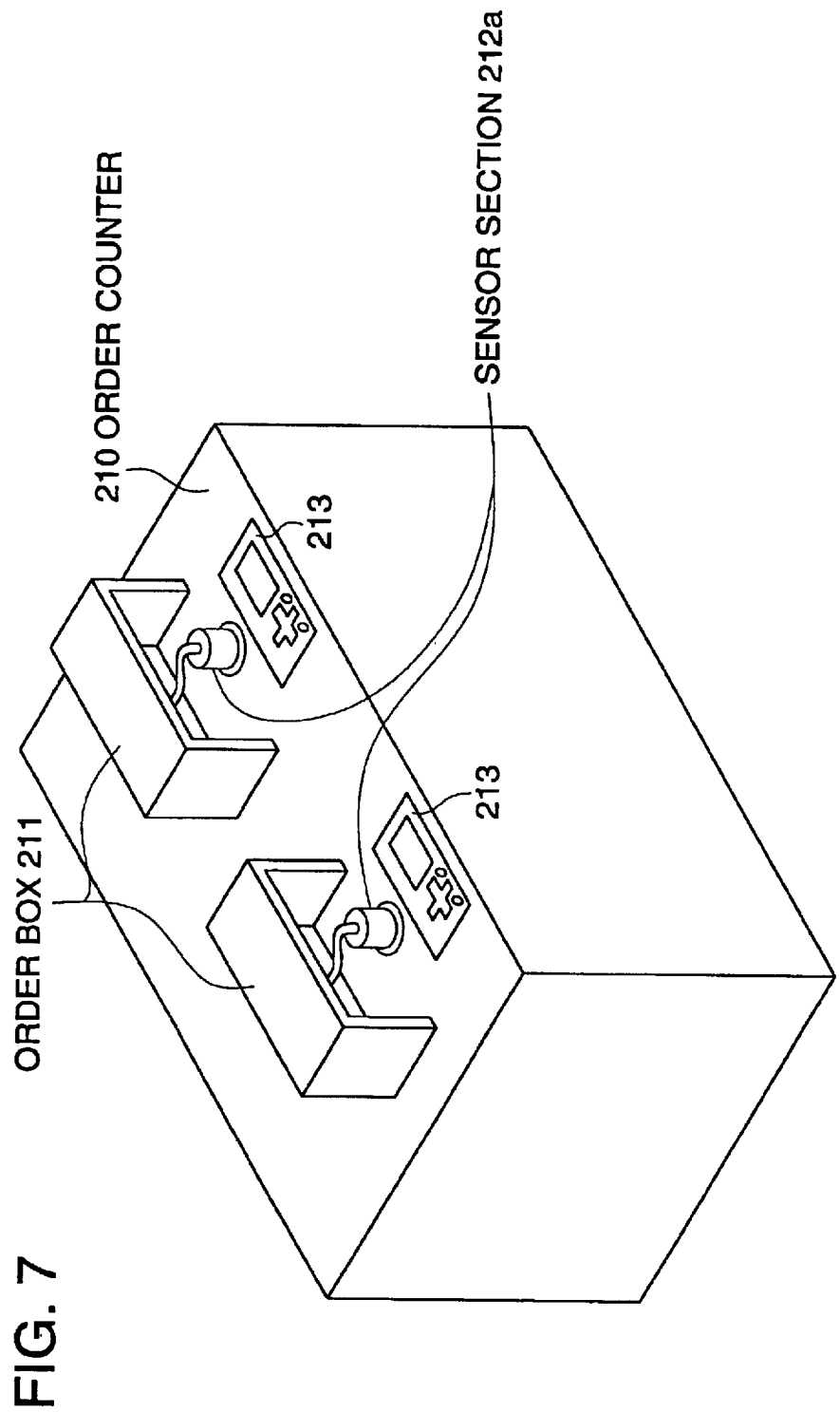
Figure 8:
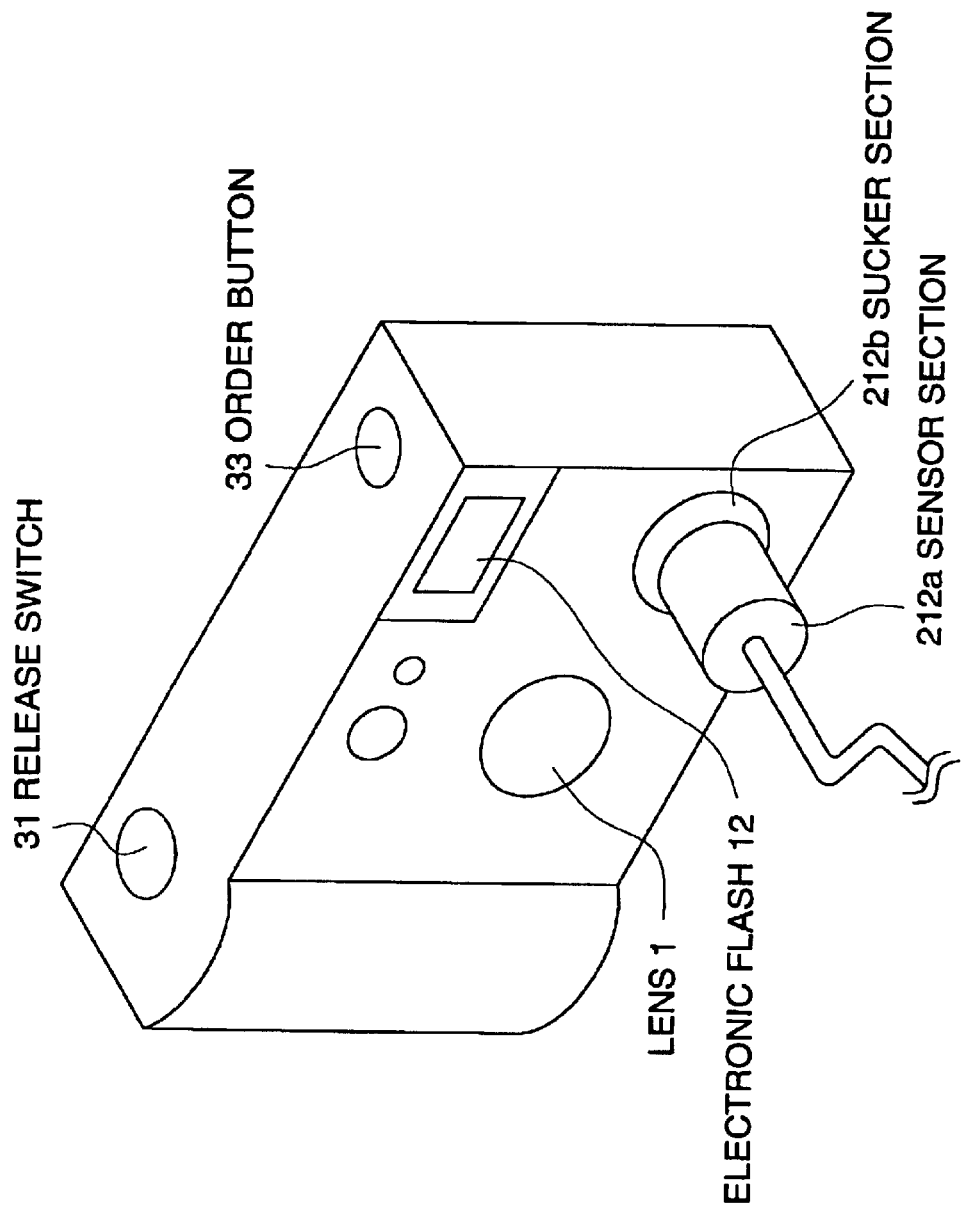

Each of FIG. 6–FIG. 8 is a perspective view showing an order receiving apparatus having a covering means.

Figure 9:
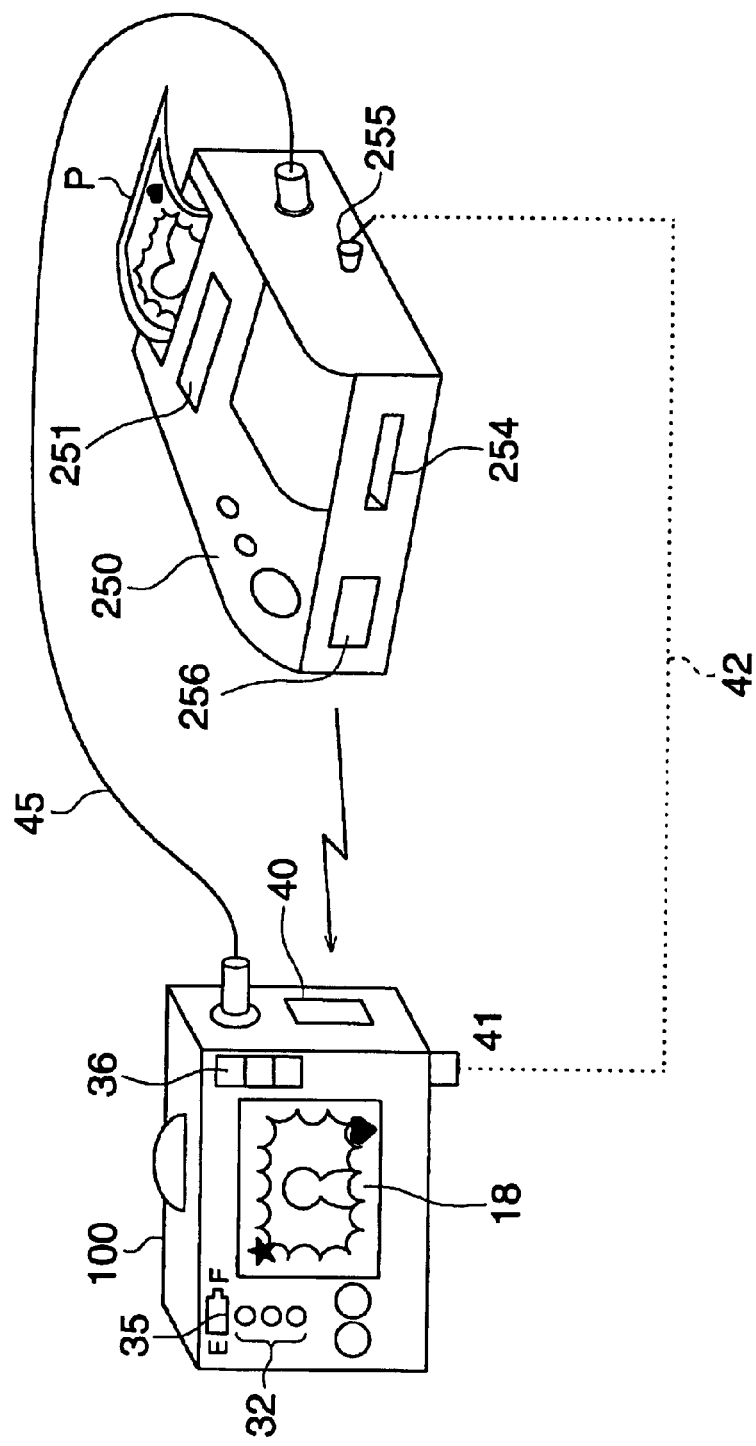

FIG. 9 is a perspective view showing an example of a home printing system.

Figure 10:
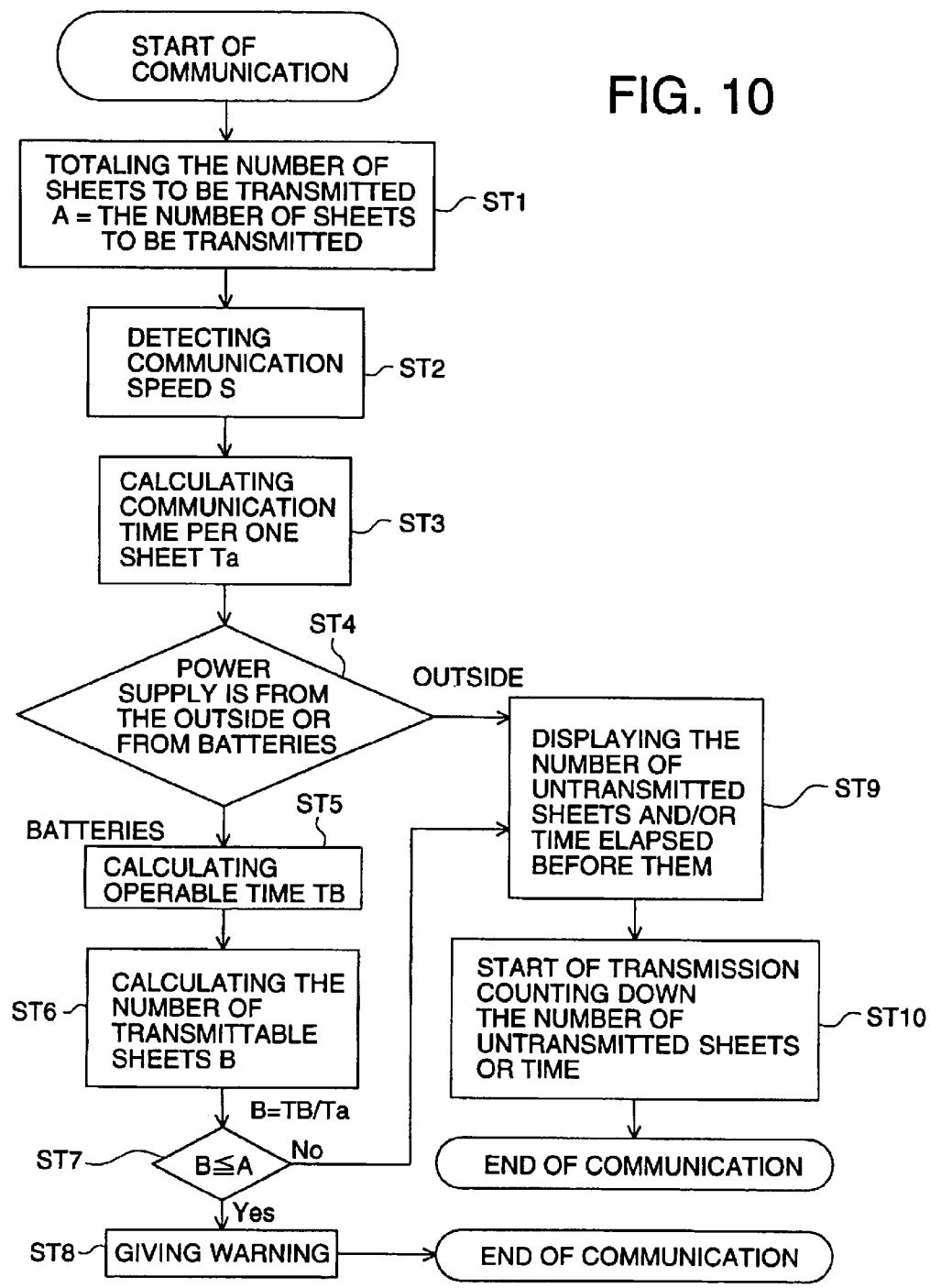

FIG. 10 is a flow chart for controlling battery capacity in an electronic camera.

Figure 11:
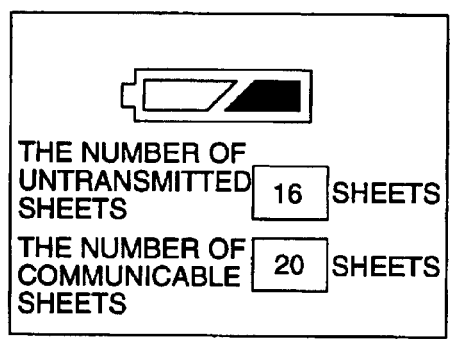
Figure 11:
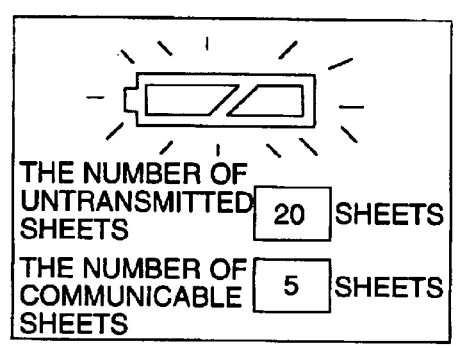
Figure 11:
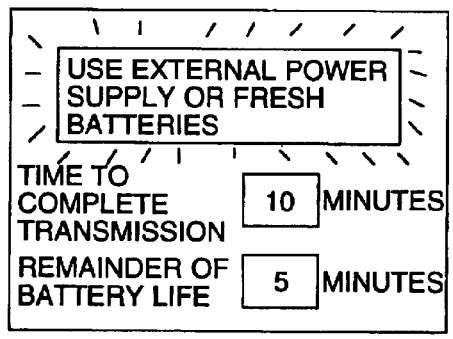

Each of FIGS. 11(a)–11(c) is a diagram illustrating how remainder of battery life is displayed.

Figure 12:
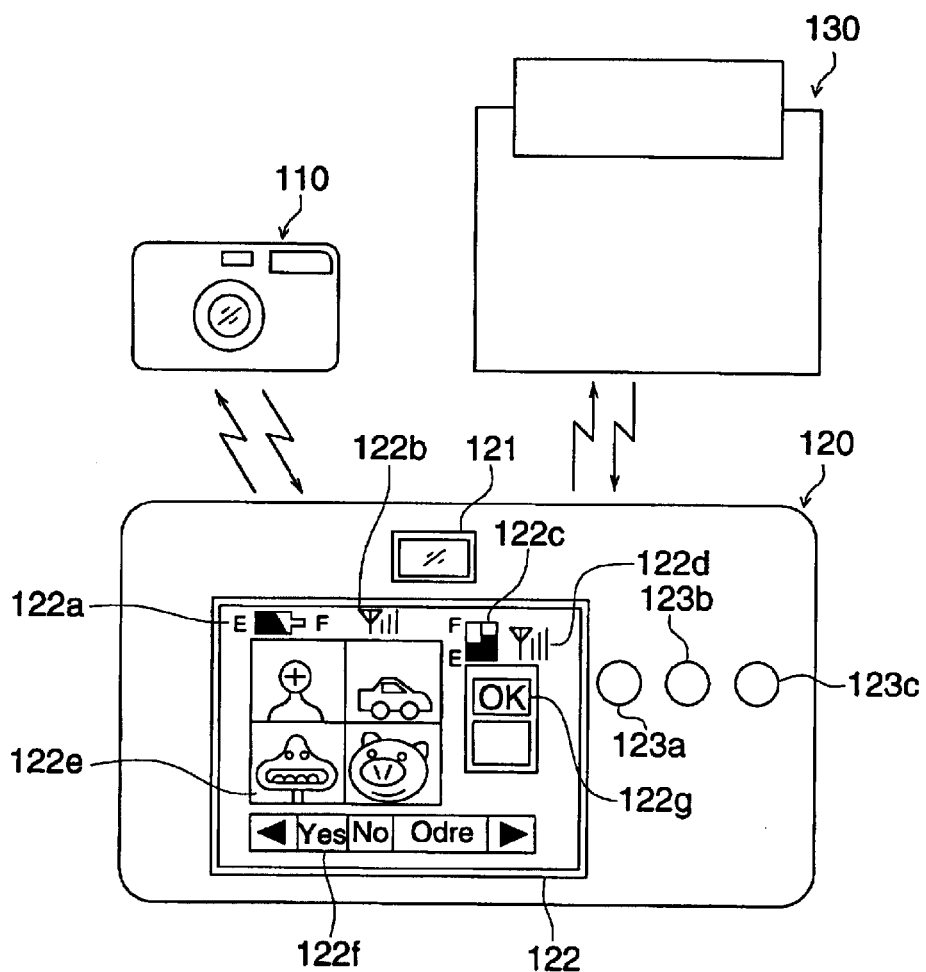

FIG. 12 is a diagram showing another example of a home printing system.

Each of FIGS. 13(a)–13(b) is a diagram showing a display section of an electronic camera shown in FIG. 12.

DETAILED DESCRIPTION OF THE PREFERRED EMBODIMENT

An embodiment of the invention will be explained in detail as follows. In the present embodiment, there will be explained a print order information accepting system composed of an electronic camera which can prepare order information easily and an order accepting device which accepts order information from the electronic camera.

(Structure of the Print Order Information Accepting System)

The structure of an electronic camera used in the present embodiment will be explained with reference to FIG. 1.

Figure 1:
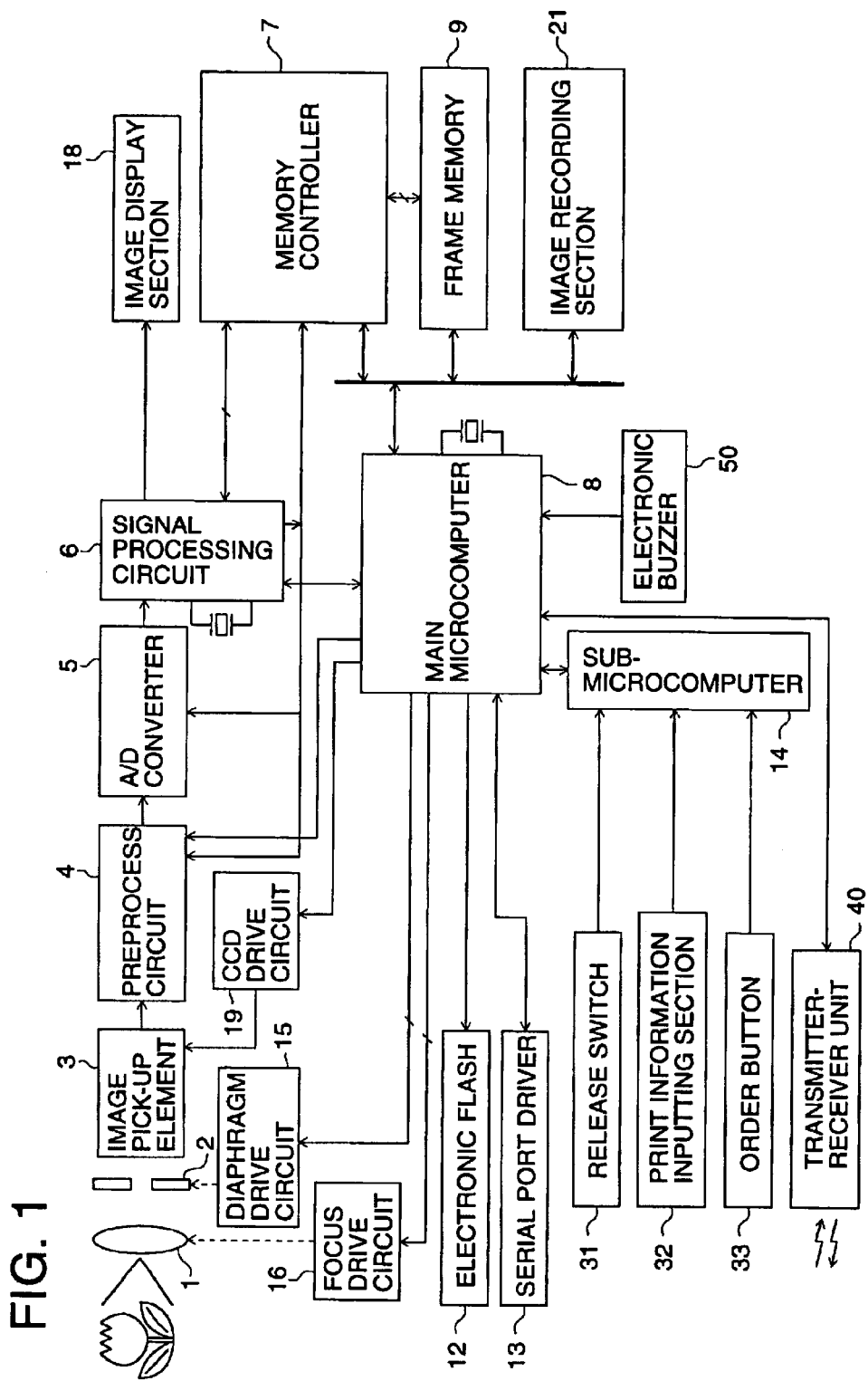
FIG. 1 is a functional block diagram showing the structure of an electronic camera used in an embodiment of the invention.

FIG. 1 is a function block diagram showing an overall, electrical and schematic structure of electronic camera 100 in the embodiment of the invention.

In the electronic camera 100 shown in FIG. 1, an optical image obtained through an optical system which is composed of lens 1, aperture-stop 2 and others is formed on a light-accepting plane of image pick-up element 3 such as CCD. Further, at this time, lens 1 and aperture-stop 2 are driven respectively by focus drive circuit 16 and diaphragm drive circuit 15.

In this case, the image pick-up element 3 photoelectrically converts an optical image formed on the light-accepting plane into an amount of electric charges, and outputs analog image signals with pulses transmitted from CCD drive circuit 19. Incidentally, the CCD drive circuit 19 can drive the image pick-up element 3 and can also control shutter speed.

The analog image signals outputted from the image pick-up element 3 are subjected to CDS (correlation double sampling) in preprocess circuit 4 whereby a noise is reduced, then subjected to AGC whereby gains are adjusted, and are subjected to Knee processing for extension of a dynamic range.

Then, after the analog image signals are converted by A-D converter 5 into digital image signals, they are subjected to luminance processing and color processing in signal processing circuit 6 to be converted into digital video signals (for example, digital data composed of luminance signal (Y) and color difference signals (Cr, Cb)), and outputted to memory controller 7.

Further, from the signal processing circuit 6, the digital video signals are outputted to image display section 18, and it is structured so that images obtained through image pick-up conducted by the image pick-up element 3 and images reproduced from a storage means which will be described later can be displayed on the image display section 18. Incidentally, various kinds of information can also be displayed on the image display section 18, in addition to images.

Switching of functions related to the foregoing is conducted through data exchange with main microcomputer 8, and it is also possible, in case of necessary, to output exposure information of image pick-up element signal, focus signal and white balance information to the main microcomputer 8.

The main microcomputer 8 mainly controls the sequence of photographing, recording and reproduction, and it further conducts, in case of necessary, compression reproduction of photographed images and serial port transmission with external equipment.

Now, an explanation will be given here under the assumption that CCITT (at present) and JPEG (or JBIG system) standardized by ISO are used as image compression of an image recording mode.

In memory controller 7, digital image data inputted from the signal processing circuit 6 are accumulated in frame memory 9, or on the contrary, image data of the frame memory 9 are outputted to the signal processing circuit 6.

The frame memory 9 is an image memory wherein image data corresponding to at least one image area or more can be accumulated, and examples thereof used generally include VRAM, SRAM and DRAM, among which VRAM which can operate independently of CPU bus is used here.

Electronic flash 12 is arranged so that its emission timing can be obtained by the main microcomputer 8 which controls photographing sequence.

Serial port driver 13 conducts signal conversion for information transmission between the camera main body and external equipment. As a serial transmission means, there are available recommended standards for conducting serial communication such as RS232C and RS422A, among which RS232C is used here.

Sub-microcomputer 14 is one which controls man-machine interface such as switches representing recording, reproduction and frame advancement, and conducts information transmission to the main microcomputer 8 in case of necessary.

Diaphragm-drive circuit 15 is composed, for example, of automatic iris, and an aperture value of optical diaphragm 2 is changed through control of the main microcomputer 8.

Focus drive circuit 16 is composed of a stepping motor, for example, and focuses image pickup element 3 on an optical focal surface of a subject by changing a lens position through the control of main microcomputer 8.

Image storage section 21 constitutes a storage means, and digital data of a JPEG form which are subjected to image compression processing conducted by main microcomputer and pass through frame memory 9 are recorded in the image storage section 21.

Incidentally, the image storage section 21 is represented by a recording/reproduction device employing a semiconductor memory capable of being mounted on and dismounted from the main body, and by a hard disk device capable of being mounted on and dismounted from the main body. When conducting transfer of data with an external computer, it is preferable that a storage medium of this still image storage section 21 is represented by various types of semiconductor memories having interchangeability with a PC card and others.

Release SW 31 is a release switch which gives instructions for image recording, and this selection is supplied to sub-microcomputer 14.

Print information inputting section 32 is a print information donating means which conducts setting and input for print information (print designating information which designates images to be printed, print size information which sets the print size, print quantity information which sets a quantity of prints, and print finish information which relates to print finish).

Order button 33 is a transmission starting means which generates transmission starting signals when it is pressed down, and when the print information and digital image information are transmitted to the outside as will be described later by the transmission starting signals.

The numeral 40 represents a transmitter-receiver unit which transmits and receives data through infrared rays and an electric wave, and it transmits print information and digital image information by means of the aforesaid transmission starting signals and receives information from the outside.

The numeral 50 represents an electronic buzzer that generates a prescribed sound at each kind of operation, and in the present embodiment, it generates a prescribed message sound even when printing is completed.

Figure 2:
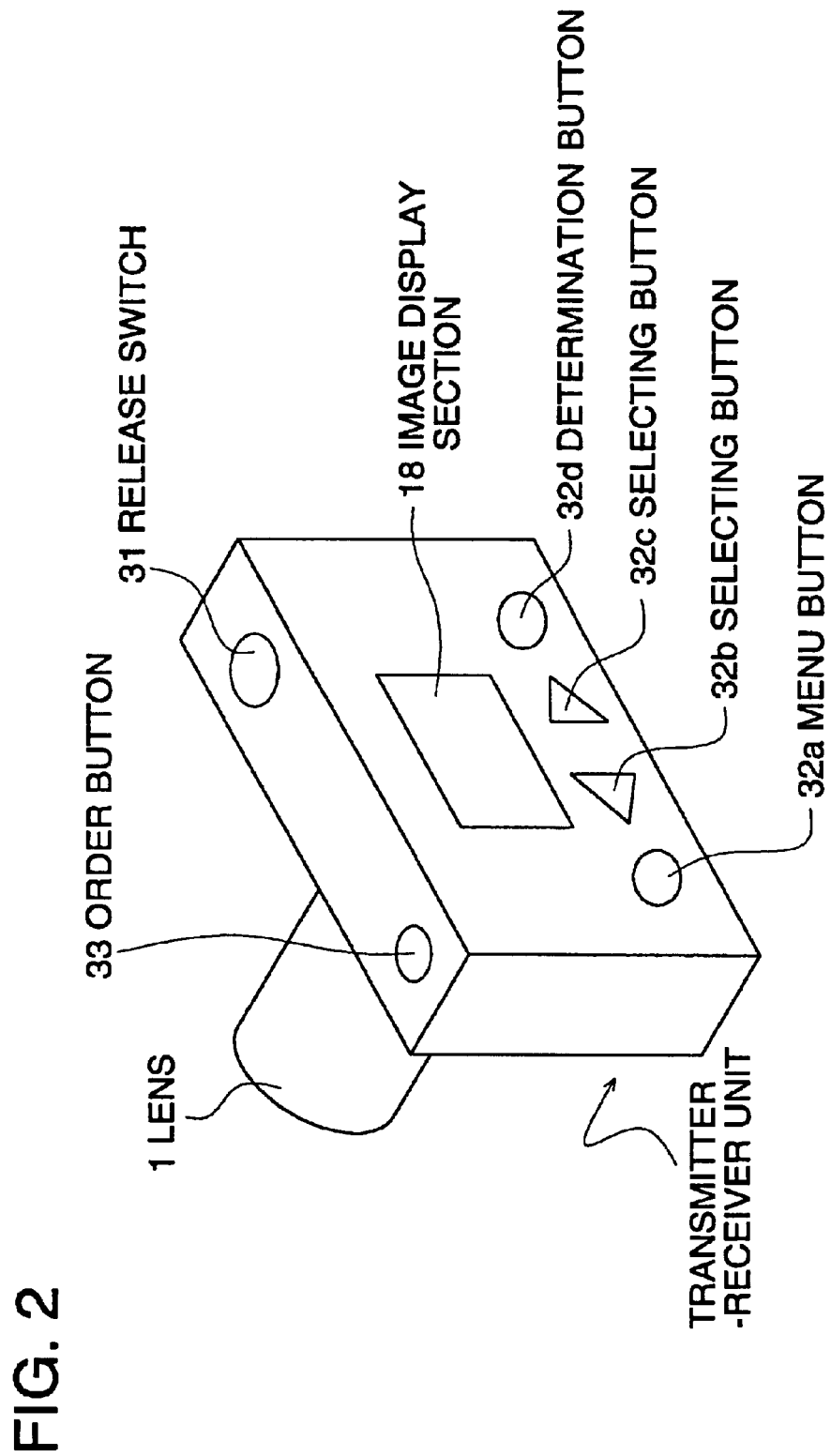
FIG. 2 is a perspective view showing an appearance of an electronic camera in an embodiment of the invention.

Incidentally, FIG. 2 is a perspective view showing the external structure of the electronic camera 100 stated earlier, and it especially shows the top and the back of the electronic camera. On the right hand side on the top of the camera, there is arranged release switch 31, while on the left hand side on the top, there is arranged order button 33. On the back of the camera, there is arranged image display section 18 such as an LCD which is structured to be capable of indicating images and various types of information. In addition, on the area below the image display section 18, there are arranged menu button 32a, selecting buttons 32b and 32c, and determination button 32d which all serve as print information inputting section 32. Incidentally, on the front side (not shown) of the camera, there is arranged a transmitting and receiving section of the transmitter-receiver unit 40.

Figure 3:
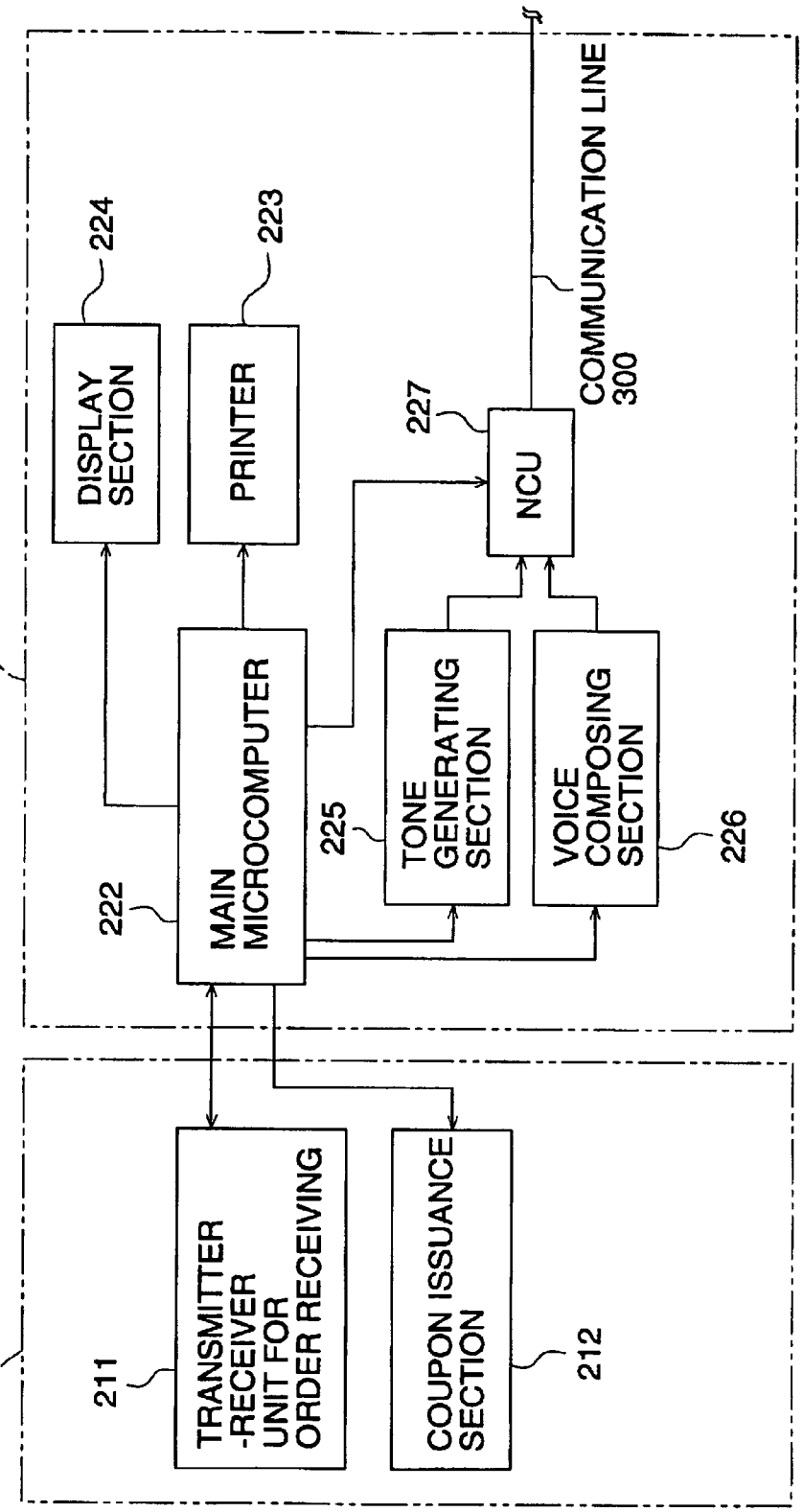
FIG. 3 is a functional block diagram showing the structure of a photofinisher representing an order receiving apparatus in a print order information receiving system in an embodiment of the invention.

Now, photofinisher 200 wherein an order receiving device is structured will be explained with reference to FIGS. 3 and 4. The photofinisher 200 is composed of order counter 210 which receives orders from users and of printing apparatus 220 which makes prints from digital image information in accordance with an order.

The order counter 210 plays a role of a table on which the electronic camera 100 shown in FIGS. 1 and 2 is placed, and transmitter-receiver unit for order receiving 211 is arranged at the position which faces transmitter-receiver unit 40 of the electronic camera 100. Order information received by the transmitter-receiver unit for order receiving 211 is supplied to the printing apparatus 220. Further, there is provided coupon issuing section 212 which issues a coupon (order evidence) that is handed to a user when an order is received from the user.

The printing apparatus 220 is one which conducts printing in accordance with order information, and it is provided with print exit 221 through which the print is outputted to the outside. In addition, main microcomputer 222 which controls an apparatus entirely is provided, and there are provided printer 223 which outputs prints under the control of the main microcomputer 222 and display section 224 which displays message concerning information of order receiving.

There are further provided tone generating section 225 which generates tones corresponding to characters used for transmitting character message to a cordless telephone and a pager, and voice composing section 226 which generates message sound that is used when calling a user through a subscribed telephone or a cordless telephone. There further is provided network control unit (NCU) 227 which dials to a subscribed telephone, a cordless telephone or a pager of a user through communication line 300, and transmits the tone stated above and the message sound to the user.

(Operations in the System to Receive Print Order Information)

Order receiving operations in the system to receive print order information will now be explained.

A user who has used electronic camera 100 for photographing and is going to have prints made by photofinisher 200 first prepares print information by the use of print information inputting section 32 provided on the back of the electronic camera 100.

For example, the user presses menu button 32a down to make a print information preparing menu to be displayed on the image display section, and uses the print information preparing menu to prepare the print information for obtaining desired prints.

In this case, selecting buttons 32b and 32c are used for the selection of items, and determination button 32d is pressed down when each item is determined. When the determination button 32d is pressed down, main microcomputer 8 prepares order information wherein the prepared print information corresponds to digital image information, and this order information is stored in an empty area of image storage section 21.

After the preparation of the aforesaid order information has been completed, the user takes the electronic camera 100 to the photofinisher 200, and places it on order counter 210. When the user presses order button 33 of the electronic camera 100 down, main microcomputer 8 reads the aforesaid order information and supplies it to transmitter-receiver unit 40. Due to this, the order information is transmitted through infrared rays or the like from the transmitter-receiver unit 40 to transmitter-receiver unit for receiving order 211.

Incidentally, in the explanation above, preparation of order information is conducted when the determination button 32d is pressed down (at the timing for finish (decision) of preparation of print information). However, it is also possible to employ an arrangement wherein order information is prepared when order button 33 is pressed down.

In this case, data of completion of order receiving can also be transmitted from the photofinisher 200 toward electronic camera 100 at the moment when order information has been transmitted from the electronic camera 100 to the photofinisher 200.

Incidentally, in this case, data transmitting and receiving based on the standard such as the known IrDA are preferable, but other system (ASK system) and data transmitting and receiving employing other electromagnetic waves such as visible light or an electric wave can also be used.

Owing to the preparation of print information stated above, it is possible to prepare order information through simple operations on the print information inputting section 32 or the control section of the electronic camera, which makes it possible for photofinisher 200 to receive orders accurately only by transmitting the order information.

When the order information is represented by information including the print information prepared by the user and digital image information, photofinisher 200 can receive orders accurately by transmitting the order information.

Print information which can be prepared by the user at this stage includes print designating information which designates images to be printed, print size information which sets the print size, information of the number of prints which sets the number of prints, and print finish information related to print finish.

Since these various kinds of information are included, a user can prepare unaided sufficient order information in advance on the print information inputting section 32 of a electronic camera, whereby time required by the order in the photofinisher 200 can be reduced. In addition, order counter 210 can be made to be an unmanned counter because a clerk does not need to write out a slip.

Here, main microcomputer 222 of printing apparatus 220 calculates the print finishing hour for each order information received, and displays it on display section 224. This print finishing hour can be obtained from the processing capacity of printer 223 and from the total amount of order information received by that time.

For example, the listing of the order number, name and the time and date to finish printing (information of order receiving) illustrated in FIG. 5 is shown on display section 224. Due to this, the time and date to finish printing is displayed immediately after the order information is received at order counter 210, which makes a user to learn that the order information has been transmitted correctly and to learn correctly the print finishing hour (FIG. 5(*a*)) or the waiting time (FIG. 5(*b*)).

When electronic camera 100 which is transmitting order information is present, it is possible to employ a method wherein columns for the time and date to finish printing and the waiting time are displayed to be a blank or under order-receiving while displaying the order receiving number and the name (see columns in FIGS. 5(*a*), (*b*) lowermost column, order-receiving number 97100100106), then the time and date to finish printing and the waiting time are displayed at the moment when order information has been transmitted correctly.

Owing to the foregoing, it is possible for a user to learn that the order information was (has been) transmitted correctly, and to learn the print finishing hour and the waiting time concretely and correctly.

When an error is caused in the course of transmitting order information from electronic camera 100, it is possible to secure correctness by indicating the order number and the name in a flashing manner, or by indicating the contents of error occurrence.

Further, together with such display on the display section 224, main microcomputer 222 gives a command for issuance of a coupon to coupon issuance section 212 so that a coupon may be issued to a user when an order is received. On this coupon, contents of order information, charges, and the aforesaid time and date to finish printing can be printed in addition to the order number and the user name.

Incidentally, in place of issuing a coupon, it is also possible to write data corresponding to the coupon on a magnetic card or an IC card brought by a user, and to deduct the charges from the magnetic card or the IC card in exchange for the prints.

In addition to display on display section 224 conducted on the part of photofinisher 200, it is possible to transmit information of order receiving to electronic camera 100. In this case, after the order information is received, main microcomputer 222 transmits the order receiving number and the time and date to finish printing among information of order receiving from transmitter-receiver unit for order receiving 211 through infrared rays.

In this case, after order information has been transmitted from the part of the electronic camera 100, the receiving state needs to be present. Therefore, main microcomputer 8 makes the transmitter-receiver unit 40 to be on its receiving state for standby, after completion of transmission of the order information.

Due to this, a user can confirm whether order information has been transmitted correctly, or an error has been caused in the order information. When an error has been caused, an arrangement wherein the order information is transmitted again by a command of main microcomputer 8 can be employed.

Due to this, accurate order receiving can be conducted about order information, and a user can confirm the order receiving by means of the electronic camera 100.

In this case, on the part of the electronic camera 100, it is possible to inform the user of whether the order information has been transmitted correctly or an error has been caused, by generating a prescribed sound from electronic buzzer 50. For example, the main microcomputer 8 controls to combine an interval and a length of a sound generated by the electronic buzzer 50 to distinguish between normality and an error.

On the part of the electronic camera 100, information of order receiving can also be displayed on image display section 18 based on the information of order receiving coming from photofinisher 200. In this case, it is also possible to display the time and date of completion of prints, in addition to the display of normality/error, whereby a user can confirm the contents of order receiving concretely with the electronic camera 100. Further, the waiting time up to completion of prints can be displayed in place of the concrete time and date of completion of prints.

When order information is transmitted from the outside of a photofinisher, this makes an order information transmitter to know that the order information has been transmitted correctly and to know the time for completion of prints or the waiting time, even when order information is transmitted from the position where display section 224 is invisible despite the inside of a photofinisher, or even when printing apparatus 220 is not provided with display section 224. Though an occasion where order information is transmitted to a photofinisher is explained in the present embodiment, it is also possible to apply to the case where order information is transmitted to a simple printer for home use and the aforesaid printer is used for printing, and it is especially effective when an image display section of a printer itself is too small to display the time for completion of prints, or when the printer has no capability to calculate the time for completion of prints.

It is further possible to arrange so that main microcomputer 222 counts down with reference to data of the time and date of completion of prints and of the waiting time, and thereby displays the residual waiting time to completion of prints momentarily on image display section 18.

Incidentally, when the residual waiting time is displayed continuously, battery consumption is accelerated. It is therefore possible to arrange so that the display is suspended in the course of countdown, and electronic buzzer 50 makes the completion of prints known at the moment when counting is finished. It is further possible to arrange so that display on image display section 18 is suspended in the course of countdown, and completion of prints is displayed on the image display section 18 when counting is finished.

Due to this, accurate order receiving can be conducted with regard to order information prepared on the part of a electronic camera, and a user can learn completion of prints when counting is finished.

Main microcomputer 8 prohibits elimination of an image included in order information until the counting is finished in the course of the countdown. Namely, even when a user operates to eliminate an image while main microcomputer 8 is counting down, elimination of the image included in order information is not executed. By doing this, the order information can surely be transmitted again even when an error is caused in the course of printing in photofinisher 200.

Incidentally, when user information is set in electronic camera 100 in advance, a telephone number included in the user information (information such as a telephone number or a pager number with which the print orderer can be called: hereinafter referred to as calling information) is transmitted, while when user information is not set in electronic camera 100 in advance, calling information inputted in accordance with menu in the course of preparing print information is transmitted, both to photofinisher 200 together with order information, as a part of the print information.

When these user information are included, the time to put down these information can be saved when ordering in photofinisher 200, thus the time required is shortened. Further, it is not necessary for a store clerk to write a slip, and order counter 210 can be made an unmanned counter.

Due to the foregoing, it is possible to call the print orderer from photofinisher 200, which therefore makes it possible to call the print orderer promptly when prints are completed or when an error is caused.

By using these user information, main microcomputer 222 makes NCU 227 to dial a person contacted by a user so that a tone corresponding to a message text may be outputted from tone generating section 225 or message voice may be outputted from voice composing section 226. It is also possible to arrange so that the main microcomputer 222 and NCU 228 may transmit an electronic mail telling completion of prints to the electronic mail address of the user.

Due to the foregoing, it is possible to inform the print orderer of completion of prints or occurrence of an error from photofinisher 200, which therefore makes it possible to call the print orderer promptly not only when prints are completed but also when an error is caused.

Incidentally, in the communication from electronic camera 100 to photofinisher 200, it sometimes happens that a battery does not last to complete communication for the order information, depending on a quantity of data, communication speed and residual battery capacity. It is therefore preferable to transmit the state of the electronic camera and a total quantity of order information from the electronic camera 100 to the photofinisher 200 to prevent the aforesaid problem.

Namely, it is possible that main microcomputer 8 generates information about a total quantity (a total quantity of data) of order information concerning the order information stated above and this information is included in the order information. By doing this, the photofinisher 200 can grasp the approximate time required for communication. As a result, the photofinisher 200 can make an estimate of the battery consumption of an electronic camera, and can give warning from it. Due to this, it is possible to prevent communication troubles caused by dead batteries, which therefore makes it possible to conduct accurate order receiving for the order information through stable communication.

Further, it is possible that main microcomputer 8 generates state information about the state of an electronic camera, and this information is included in the order information. This state information is included in the order information and is transmitted each time the state of the electronic camera is changed, or at regular intervals. It is assumed that this state information is analyzed by main microcomputer 222 of printing apparatus 220 in the arrangement.

Incidentally, the state information is considered to be any one of the following items or a combination of the following plural items.

Information about the presence of connection with external power supply

Information about battery types (manganese cell, alkaline cell, nickel-cadmium battery, nickel-hydrogen battery and lithium battery)

Information about the number of batteries

Information about the residual capacity of batteries

Information about the presence (ON/OFF) of display on image display section 18

Information about the discrimination number specific to an electronic camera

Information about the discrimination number of a user

Information about consumed power

Information about warning display by an electronic camera

Information about the maximum communication speed

Information about the operatable time

By doing this, the photofinisher 200 can grasp the approximate time required for communication and the state of an electronic camera each time the state of the electronic camera is changed or at regular intervals (on a real time basis).

When it is estimated by operation of main microcomputer 222 that a battery can not last to complete transmission of the order information, printing apparatus 220 gives warning through the following. This warning is given especially when external power is not supplied to electronic camera 100.

Warning display on display section 224

Output of warning message by voice composing section 226

Transmission of warning message employing NCU 227

Transmission of warning message data to electronic camera 100

When the warning message data are transmitted to electronic camera 100, the warning is given through warning display on image display section 18 on the part of electronic camera 100 or through generation of warning sound made by electronic buzzer 50.

The display of the aforesaid warning can be conducted simultaneously with the display of the print completion time or of the waiting time on display section 224 or on image display section 18, which makes a store clerk in the photofinisher and a user to become aware surely.

Due to this, it is possible to prevent dead batteries, and to conduct accurate order receiving for the order information through stable communication.

It is arranged in the embodiment stated above so that print information is transmitted from an electronic camera to an order receiving apparatus of an image forming apparatus through a communication means employing electromagnetic waves such as infrared rays. When such order receiving through communication is conducted by many people simultaneously, it is feared that an order can not be received accurately, because jamming of information from each electronic camera makes information of one person to stray into that of another person, or interference and interruption make order receiving to be suspended.

Examples of the invention to prevent the aforesaid troubles will be explained as follows with reference to FIG. 6–FIG. 8. FIG. 6 shows a variation of order counter 210 shown in FIG. 4.

Figure 4:
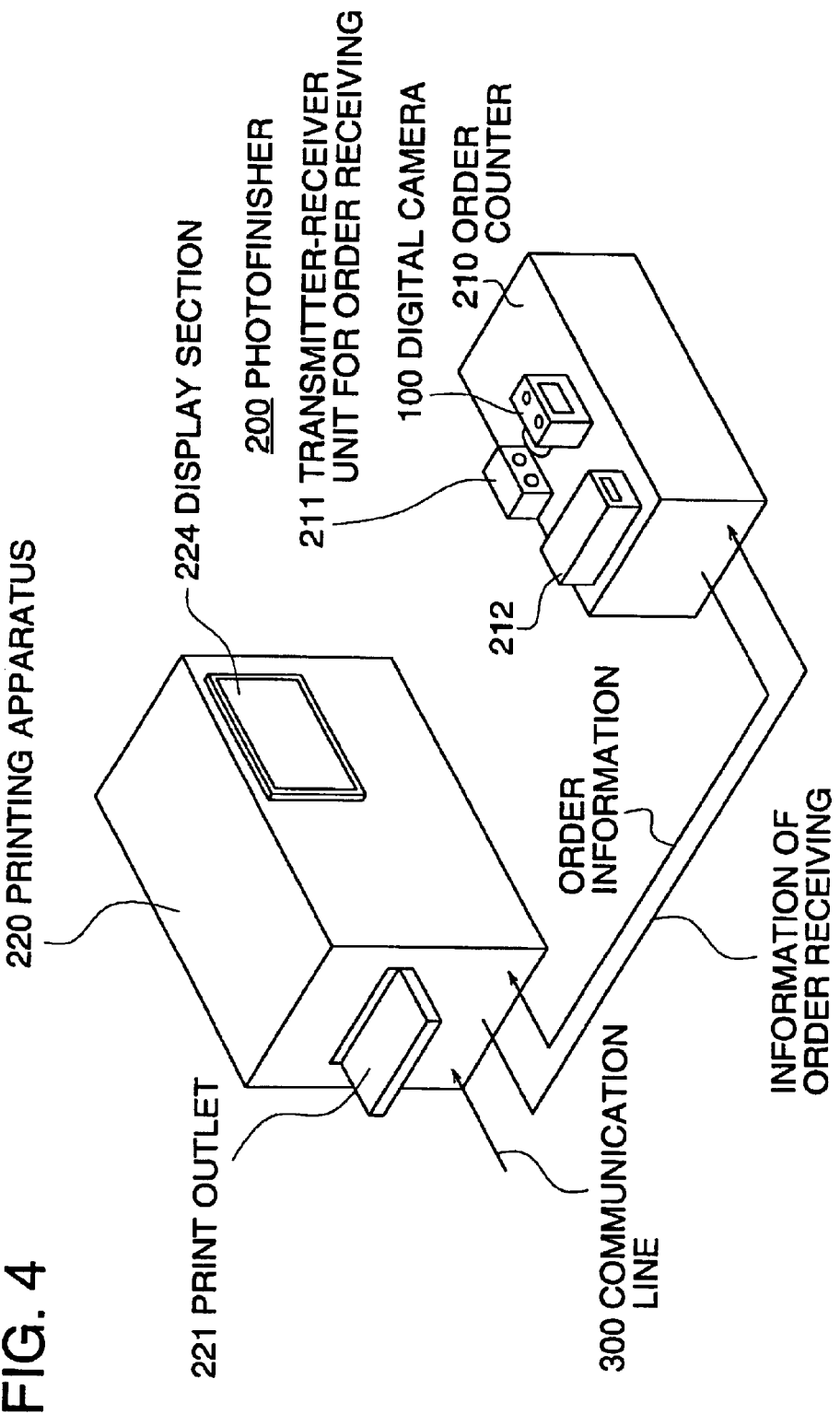
FIG. 4 is a perspective view showing the external structure of a photofinisher representing an order receiving apparatus in a print order information receiving system in an embodiment of the invention.

Order counter 210 in FIG. 6 also plays a role of a table on which electronic camera 100 is placed, as in the order counter shown in FIG. 4. On the order counter 210 in the present example, there is provided order box 211 serving as a shielding means which is provided to surround the electronic camera 100 and shields various signals coming from the outside. This order box 211 is one having a function at least to shield electromagnetic waves (for example, infrared rays) used for communication.

Shielding in this case means attenuating sufficiently. This means that when communicating from certain electronic camera 100 to sensor section 212a, a signal level at another sensor section is made to be identical to or lower than the receivable signal level at that sensor section. From the viewpoint of preventing jamming, it means that when communicating from certain electronic camera 100 to sensor section 212a, an action is taken so that the communication may not be affected by signals coming from another electronic camera.

Incidentally, surrounding means that the vicinity of the electronic camera 100 and that of sensor section 212a are covered and thereby signals from the outside are intercepted so that they may not be received by the sensor section 212a. It is not necessary to cover both the electronic camera and the sensor section entirely.

On the location to face communication unit 40 of the electronic camera 100 on the inner wall surface of the order box 211, there is provided sensor section 212a of order receiving communication unit 212. Order information received by the order receiving communication unit 212 through the sensor section 212a is supplied to main microcomputer 222 in printing apparatus 220. Incidentally, with regard to the number of sensor sections 212a on the inner wall surface of the order box 211, plural sensor sections can be present instead of one sensor section. Further, the sensor section 212a may also be provided with a light emitting function in addition to a photoreceptive function.

Operation display section 213 is arranged on the order counter 210 or on the outer surface of the order box 211. This operation display section 213 is to be provided with a cursor key, a selection/determination button and a display unit. Directives for operations on the operation display section 213 are supplied to main microcomputer 222 in printing apparatus 220. Further, based on directives from the main microcomputer 222, various kinds of messages are displayed on a display unit of the operation display section 213.

Incidentally, both order counter 210 and printing apparatus 220 may either be united solidly or be arranged to be separate.

Order receiving operations in the printing system in the present example will be explained.

After preparation of print information has been completed, a user takes an electronic camera 100 to photofinisher 200, then lifts the order box 211 on the order counter 210, and places it at the prescribed position (the position surrounded by the order box 211). Then, the user closes the order box 211.

By doing this, the order box 211 representing a shielding means surrounds the electronic camera 100 and sensor section 212a. Therefore, various kinds of signals from the outside (signals from other electronic cameras, noise from a fluorescent lamp and others) are intercepted.

When a user operates a cursor or an operation button on the operation display section 213, or when the main microcomputer 222 detects that the order box 211 on which the electronic camera 100 is placed is closed, the main microcomputer 222 transmits order receiving information to the electronic camera 100 from the order receiving communication unit 212.

On the part of the electronic camera 100, control is made so that main microcomputer 8 transmits order information from communication unit 40 when the aforesaid order receiving information is received. Due to this, order information is transmitted automatically through infrared rays from the communication unit 40 to the order receiving communication unit 212.

In this case, when transmission of the order information from the electronic camera 100 to the photofinisher 200 has been completed, main microcomputer 222 is made to display the normal completion of order receiving on the operation display section 213. When any error happens, on the other hand, main microcomputer 222 displays the error on the operation display section 213 in the same way.

In the case of such communication, data communication through infrared rays based on the standard of the known IrDA is preferable. However, data communication of another system (ASK system) or data communication employing another electromagnetic wave such as visible light or an electric wave is also acceptable. In that case, order box 211 representing a shielding means which is suitable for intercepting an electromagnetic wave having the wavelength used for communication can be used.

Through the aforesaid arrangement, signals of the targeted order information reach the photofinisher 200, while other signals which are not targeted (signals from other cameras and various kinds of noises from the outside) are intercepted and do not reach the photofinisher 200, thereby correct and accurate order receiving for order information can be conducted.

Accordingly, even when order information is transmitted from each of plural electronic cameras simultaneously, interference with other order information is not caused, and various kinds of signals from the outside are not received, thus accurate order receiving can be conducted through the communication means.

When conducting order receiving for order information by intercepting as stated above, the time required for ordering in photofinisher 200 can be shortened. In addition, it is not necessary for a store clerk to write a slip, and many orders can be handled in parallel, thus it is possible to reduce the number of operators in the photofinisher 200.

Each of FIGS. 7 and 8 shows an example wherein a sensor is used as a shielding means. Namely, though the structure of order box 211 in FIG. 7 is the same as that in FIG. 6, sensor section 212a is structured to be mounted on and dismounted from electronic camera 100.

The sensor section 212a is connected by a threadable connection cord, and is equipped with sucker portion 212b as shown in FIG. 8. The sensor section 212a is stuck on the vicinity of communication unit 40 of the electronic camera 100 by the use of the sucker section 212b.

Through this arrangement, various kinds of signals from the outside (signals from other electronic cameras and noises from fluorescent lamps) are intercepted, because the electronic camera 100 and sensor section 212a are surrounded by order box 211 representing a shielding means, and because the sensor section 212a is in close contact with the electronic camera 100.

Incidentally, even when it is difficult to stick the sensor section 212a because of roughness on the surface of the electronic camera 100, only arrangement to cause the sensor section 212a to face the communication unit 40 creates the state wherein signals from the outside are intercepted by the order box 211 representing a shielding means.

Next, referring to FIG. 9, there will be explained an example of a home print system structured only by a simple printer which has a simple display function and a simple control function without purchasing a personal computer and is relatively inexpensive.

In FIG. 9, electronic camera 100 has functions shown on a block diagram in FIG. 1, and is equipped with image display section 18, print information inputting section 32, battery residual power display section 35 and printer state display section 36.

The image display section 18 displays a subject when photographing, and in addition, it can display prepared print information when inputting and preparing the print information, and it can also display received printer state information when the printer state information has been received from the printer side.

Printer 250 is arranged so that images are printed on photographic paper P by a printing head when image data transmitted from transmitter-receiver section 40 of electronic camera 100 are received from communication interface section 256. On liquid crystal panel 9, there are displayed residual amount of ink and residual amount of sheets to be used. Incidentally, it is also possible to input various kinds of data from a memory card mounted on memory card interface section 254. Further, owing to cable 42 shown with dotted lines, data can be inputted and outputted through terminal 41 of the electronic camera 100 and serial interface section 255 of printer 250. When the power supply standards are compatible, it is possible to supply the power from printer 250 to the electronic camera 100 through AC adapter 103.

In the aforesaid structure, when print information is prepared by print information inputting section 32 of the electronic camera 100, the print information is transmitted from transmitter-receiver section 40 to communication interface section 256 on the printer side together with digital image information.

This communication is conducted by main microcomputer 8 of the electronic camera 100 in accordance with procedures shown in a flow chart in FIG. 10. After the start of communication, the number of sheets required for transmission A is calculated first (ST1). However, it is also possible to use the number of bytes required for transmission in place of the number of sheets required for transmission, as a standard of an amount of communication. Communication speed S is detected (ST2). Time Ta required for communication for one sheet is calculated (ST3). Then, the power supply used by the electronic camera 100 currently is judged whether it is a battery in the electronic camera or it is an external power supply (ST4). When the battery in the electronic camera is used, operating time TB which can be covered by the battery is calculated (ST5). Number of transmittable sheets B is calculated (ST6). Number of sheets requiring transmission A is compared with the number of transmittable sheets B.(ST7). When the number of sheets requiring transmission A is greater than the number of transmittable sheets B, warning is given (ST8). When the number of sheets requiring transmission A is smaller than the number of transmittable sheets B, or when the power supply which is used currently is an external power supply, the number of sheets requiring transmission and/or time required for transmission is displayed (ST9). After that, the transmission is started, and the number of sheets requiring transmission and/or time required for the transmission is counted down to be displayed (ST10).

Each of FIGS. 11(a)–11(c) is a diagram showing a concrete example of battery residual power display section 35. In FIG. 11(a), warning is given because the number of sheets requiring transmission A is smaller than the number of transmittable sheets B. In FIG. 11(b), warning is given by flickering the battery display, because the number of sheets requiring transmission A is greater than the number of transmittable sheets B. In place of the flickering of the battery display, it is also possible to sound a buzzer. FIG. 11(c) shows an example wherein concrete directions are displayed in place of warning by means of flickering of battery display or of a buzzer.

The foregoing is an example wherein the state of an internal power supply in an electronic camera can be confirmed on the display section of the electronic camera by a user. When a home printing system is structured only by a simple printer whose display function and control function are of a simple type and are relatively inexpensive, it is preferable to make it possible for a user to confirm the waiting time up to completion of prints on a display section of an electronic camera, or to make it possible for a user to confirm the state of a printer by receiving the state information of the printer and by displaying it.

Another example to control a printing system by using a displaying section of an electronic camera will be explained as follows with reference to FIG. 12 and FIG. 13. An image forming system shown in FIG. 12 is composed of child camera 110 representing an electronic camera for recording image information, parent camera 120 representing an electronic camera and printer 130 representing an image forming apparatus.

Though the child camera 110 has a function to record image data obtained through image pick-up and a function to transmit the image data through a wireless system, it does not have a function to transmit the image data to printer 130 directly to output images, because of its simple and inexpensive structure. It is therefore necessary to provide some interface means for preparing an order file which is necessary to receive image data of the child camera 110 to output images on the printer 130.

The one which plays a role of the interface means is parent camera 120. The parent camera 120 is arranged so that it can receive image data from the child camera 110, prepare an order file wherein images to be outputted and the number of sheets are established, and transmit the image data and the order file to printer 130 to output necessary images. The parent camera 120 will be explained as follows more concretely.

In FIG. 12, there is shown the back of the parent camera 120 on which optical viewfinder 121, liquid crystal screen 122 of a touch panel type, and operation buttons 123a, 123b and 123c are arranged. The operation buttons 123a–123c are those to switch menus and modes in the same way as in the prior art, and details of them are omitted here accordingly.

In the display mode shown in the drawing, battery mark 122a including symbols F and E and antenna mark 122b are displayed on the liquid crystal screen 122. The parent camera 120 has functions to detect residual power of a battery of the child camera 110 and to detect the state of communication between the parent camera 120 and the child camera 110. The detected residual power of a battery of the child camera 110 is displayed with battery mark 122a which shows that the residual power of a battery is less as an indication moves in the direction from symbol F to that E. On the other hand, the detected state of communication between the parent camera 120 and the child camera 110 is displayed with antenna mark 122b which shows that the best state of communication is shown with three vertical lines in the drawing, and the state of communication is worse when the number of vertical lines is less.

Further, in the display mode shown in FIG. 12, there are displayed rectangular mark 122c including symbols F and E and antenna mark 122d on the upper portion on the right of liquid crystal screen 122. The parent camera 120 has a function to detect residual amount of sheets to be used in printer 130 and/or residual amount of ink of the printer 130 and to detect the state of communication with the printer 130. When the detected residual amount of sheets and/or residual amount of ink of the printer 130 is displayed on the rectangular mark 122c which shows that the residual amount decreases as an indication moves from symbol F to that E. On the other hand, the detected state of communication with the printer 130 is displayed with antenna mark 122b which shows that the best state of communication is shown with three vertical lines in the drawing, and the state of communication is worse when the number of vertical lines is less. Incidentally, when the state of communication between the child camera 110 and the parent camera 120 is worsened to be cut, the child camera 110 turns off the power supply automatically, while when the state of communication between the parent camera 120 and the child camera 110 plus the printer 130 is worsened to be cut, the parent camera 120 turns off the power supply automatically, whereby consumption of batteries can be prevented.

The parent camera 120 is arranged so that it can grasp the state of operations of the child camera 110 and the printer 130 as stated above. Therefore, before the child camera 110 or the printer 130 falls into malfunction, it is possible to prevent the malfunction by taking an action to replenish batteries, sheets or ink, for example. Incidentally, when communicating with either the child camera 110 or the printer 130, the antenna mark 122b or 122d whichever relating to the communication flashes.

On the central portion on the left hand side of the liquid crystal screen 122, there are displayed four frames of thumbnail images 122e. The thumbnail images 122e are the same images as those obtained through image pick-up, and they can be displayed to be small for index display, and they can be processed rapidly because of their small data capacity.

Below the thumbnail images 122e on the liquid crystal screen 122, there are displayed operation button 122f of a touch panel type. Since the display screen 122 is of a touch panel type, signals corresponding to the pressed portion of operation button 122f are inputted in the parent camera 120, whereby an order file is prepared as information concerning the images. More specifically, when either one of triangle marks at right and left in operation button 122f is pressed, the display of the thumbnail images 122e is changed to the frame order direction or to the direction opposite to that. When a user desires prints, the user can designate printing of the corresponding images by pressing specific thumbnail image 122e and "Yes" mark of operation button 122f continuously with fingers. When no prints are desired, the user presses thumbnail image 122e and "No" mark of operation button 122f continuously with fingers. When preparing an order file, it is also considered to designate only images which are not desired to be outputted by pressing "No" mark under the assumption that at least one sheet is outputted definitely for each of all images.

After preparing the order file in the aforesaid method, a user starts transmission to printer 130 by pressing "Order" mark of operation button 122f. Incidentally, the state of operations of the printer 130 are displayed with mark 122g on the liquid crystal screen 122. When this mark 122g is displayed to be OK, it indicates that printing is carried out smoothly, while when some troubles happen on the printer 130, error messages appear on mark 122g.

Incidentally, in this case, the parent camera 120 takes in all image data from the child camera 110, and then transmits only data for images to be printed to the printer 130. When the number of prints is plural, data of that image for the prints can be transmitted by repeating for the number of times equivalent to the number of the prints instead of copying the image on the part of the printer 130. In this embodiment, processing on the printer 130 side is easy though the communication time is long. On the other hand, it is possible to transmit all image data to the printer 130 regardless of whether the image is printed or not. The basis for this is that when all image data of the child camera 110 and the parent camera 120 are deleted in the case of an error in an order file, it still is possible to output necessary images.

Figure 13:
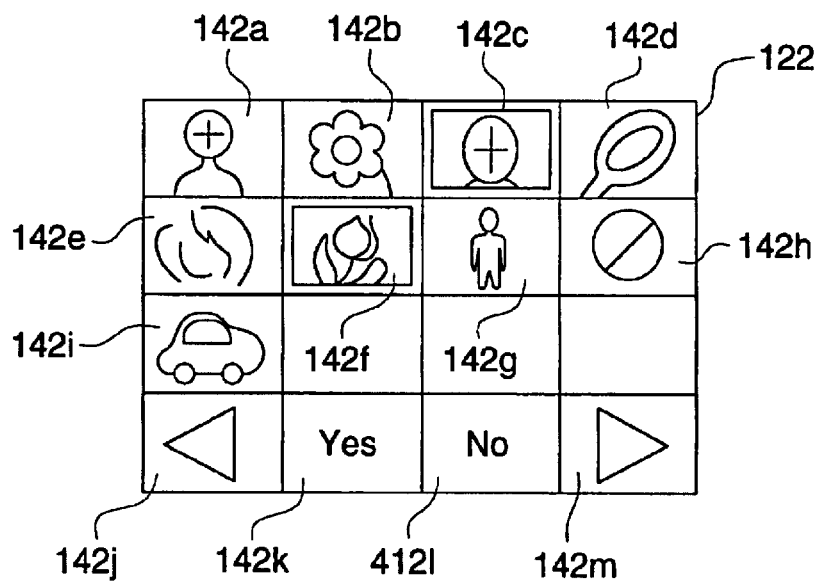
Figure 13:
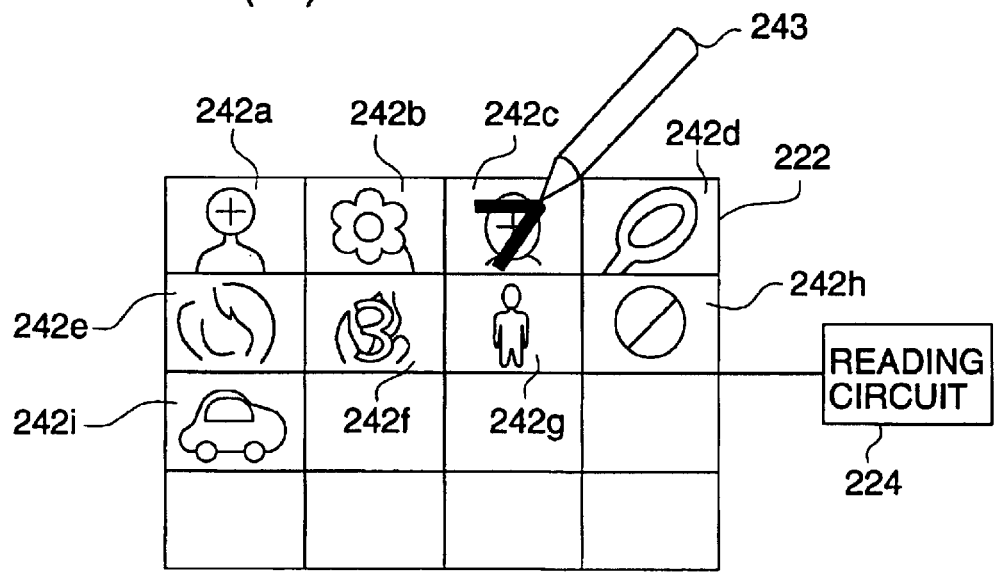

FIG. 13 is a diagram showing a variation in preparing an order file. In FIG. 13(a), there is shown liquid crystal screen 142 of a touch panel type which is the same as display screen 122 in FIG. 12. On display screen 142, there are shown nine thumbnail screens 142a–142i and operation buttons 142j–142m.

When preparing an order file, it is possible to write in the file that a certain image is to be printed, by pressing either of thumbnail images 142a–142i corresponding to the image for which a print is desired. It is also possible to write in the order file that when thumbnail images 142a–142i are pressed plural times, images in the quantity identical to the number of times for the pressing are to be printed. Incidentally, thumbnail images 142a–142i pressed plural times are displayed to be superposed in a slightly smaller size, which indicates the number of prints ordered. Further, the same operations as in FIG. 11 cam be carried out by the operation buttons 142j–142m.

FIG. 13(b) is a diagram showing another variation. In FIG. 13(b), there is shown liquid crystal screen 242 of a touch panel type to which reading circuit 224 which can read a numeral written by pen 243 on the liquid crystal screen 242 is connected. On display screen 242, there are shown nine thumbnail images 242a–242i.

In the case of preparing an order file, when a numeral (for example, 7) is written by pen 223 on thumbnail images 142a–142i (for example, 222b) corresponding to the image for which a print is desired, the reading circuit 224 reads the numeral and its position so that the number of prints (7 prints) for the corresponding image may be designated in the order file. When no numeral is written, the number of prints is designated to be zero. On the other hand, the thumbnail image for which the number of prints has been designated is displayed together with a numeral that is superposed on that image (see image 222f). Incidentally, in the case of changing the number of prints, when two lines are drawn by pen 223 on the numeral, the number of prints designated is deleted. After that, the number of prints desired is written newly.

After the order has been placed in the aforesaid way, it is possible to confirm the contents of the order by selecting a preview mode on parent camera 120. When the preview mode is selected, thumbnail images corresponding to images for which prints are desired are displayed in the running state as shown in FIGS. 12(a) and 12(b). In such a case, the number of prints can be confirmed by the numeral displayed to be superposed on the image as shown in FIG. 12(b). On the other hand, it is also possible to display the number of prints by repeating the thumbnail image of the corresponding number. It is further possible to display or preserve all images or only thumbnail images corresponding to images for which prints are desired as an index image, and to make the index image to be printed by printer 130. Incidentally, with regard to an order for displaying thumbnail images, there are considered an order of frames, an order of dates and an order of transmission, or inverse orders for them.

Incidentally, as a means to operate parent camera 120, there is considered a remote-controlled device equipped, for example, with an infrared rays information transmission means used in a TV set. A parent camera is required to be small in size to be portable, and its operation buttons for inputting in preparation of its order file are restricted in terms of size and number. On the other hand, a remote-controlled device for a TV set is designed, giving consideration to easy operation, and therefore, it is relatively easy to input by means of operation buttons. The remote-controlled device itself is also very popular, and it is owned by almost all homes.

If it is possible to make an arrangement so that a parent camera may be operated by such remote-controlled device, it is possible to prepare an order file easily. Incidentally, in such a case, it is possible to arrange so that the parent camera moves to the order file preparing mode when the remote-controlled device is turned on while it is directed to the parent camera. It is further possible to arrange so that TV-channel-switching buttons have frame number designating functions, a volume-adjusting button has a sheet-quantity-designating function, and an input-switching button has a function to designate YES/NO, in the remote-controlled device. In addition to this, it is possible to conduct designation of the time for completion of prints (especially urgent, normal, on and after tomorrow), designation of image quality (fine, normal etc.), designation of print object (sheet material suitable for long term preservation, color sheet, note, cup and food) and designation of a printer (an ink-jet printer, a thermal printer). Incidentally, in the case of urgent printing, it is possible to designate to use an ink-jet printer, a printer of thermal type or the like.

Even in the case of an electronic camera in the present example, it is possible to confirm the state of an internal battery of an electronic camera shown on a flow chart in FIG. 10 by structuring battery mark 122a as shown in FIG. 10(a) through FIG. 10(c), and it is possible to give warning. It is further preferable that a user can confirm the waiting time up to completion of prints on a display section of the electronic camera, or information of the state of a printer is received and displayed, and thereby, a user can confirm the state of the printer.

What is claimed is:

1. A camera comprising:
   an image-pickup device for receiving light to form an image of a subject, for converting the light into electric signals representing the image, and for producing image information of plural different images of plural different subjects by electric signals;
   a print information producing device for producing print information for printing the image information, the print information including print designating information which designates an image to be printed among the plural different images;
   a transmitting device for transmitting the image information and the print information to an external apparatus; and
   a receiving device for receiving image forming apparatus information representing the condition of an image forming apparatus to which the transmitting device transmits the image information and the print information.

2. The camera of claim 1, wherein the print information producing device produces the print information further including print quantity information, which expresses a quantity of prints, and the transmitting device transmits the image information and the print information including the print designating information and the print quantity information.

3. The camera of claim 1, further comprising:
   an inputting device for inputting information necessary for producing the print information, wherein the print information producing device produces the print information on the basis of the information inputted by the inputting device.

4. The camera of claim 1, further comprising:
   a power source for supplying electricity to at least one of the image-pickup device, the print information producing device and the transmitting device; and
   a detecting device for detecting the condition of the power source and for obtaining the power source information, wherein the transmitting device transmits information based on the power source information.

5. The camera of claim 4, wherein the power source is a battery, the detecting device is able to estimate the situation that the capacity of the battery is insufficient until the completion of transmitting for the image information and the print information, and the display device indicates warning when the detecting device estimates the situation that the capacity of the battery is insufficient until the completion of transmitting for the image information.

6. The camera of claim 1, further comprising:
   a power source for supplying electricity to at least one of the image-pickup device, the print information producing device and the transmitting device;
   a detecting device for detecting the condition of the power source and for obtaining the power source information; and
   a display device for indicating the power source information.

7. The camera of claim 1, further comprising:
   a display device for indicating the image forming apparatus information.

8. The camera of claim 1, further comprising:
   a device for indicating warning on the basis of the image forming apparatus information.

9. The camera of claim 1, further comprising:
   a device for indicating a communicating situation between the camera and the image forming apparatus.

10. The camera of claim 1, wherein the receiving device receives information regarding the image forming capability of the image forming apparatus.

11. The camera of claim 10, further comprising:
    a device for indicating the information regarding the image forming capability of an image forming apparatus.

12. The camera of claim 1, wherein the transmitting device is a device for conducting wireless communication.

13. The camera of claim 1, wherein:
    the receiving device receives receipt information produced by the image forming apparatus; and
    the camera further comprises a display device for indicating the receipt information.

14. The camera of claim 13, wherein the receipt information includes a waiting time for the completion of printing and a receipt condition whether or not information transmitted from the transmitting device is received normally.

15. The camera of claim 1, wherein the transmitting device transmits the ID of the camera and the ID of the transmitter with the correlation with the image information.

16. The camera of claim 15, further comprising:
    a receiving device for receiving information indicating the completion of printing from the image forming apparatus to which the transmitting device transmits the image information and the print information.

17. The camera of claim 1, further comprising:
    a receiving device for receiving operating information from an external remote control unit, wherein the print information producing device produces the print information based on the operating information from the external remote control unit.

18. A camera comprising:
    an image-pickup device for receiving light to form an image of a subject, for converting the light into electric signals representing the image, and for producing image information of plural different images of plural different subjects by electric signals;
    a print information producing device for producing print information for printing the image information, the print information including print designating information which designates an image to be printed among the plural different images;

a transmitting device for transmitting the image information and the print information to an external apparatus; and a receiving device for receiving image information from another camera, wherein the transmitting device transmits the image information received from the another camera and the print information.

* * * * *